United States Patent [19]
Drabarek

[11] Patent Number: 5,933,237
[45] Date of Patent: Aug. 3, 1999

[54] INTERFEROMETRIC INSTRUMENT

[75] Inventor: Pawel Drabarek, Tiefenbronn, Germany

[73] Assignee: Robert Bosch GmbH, Stuttgart, Germany

[21] Appl. No.: 09/083,337

[22] Filed: May 22, 1998

[30] Foreign Application Priority Data

May 26, 1997 [DE] Germany .......................... 197 21 843

[51] Int. Cl.[6] .................................................. G01B 9/02
[52] U.S. Cl. .......................................... 356/360; 356/349
[58] Field of Search .................................... 356/349, 351, 356/359, 360

[56] References Cited

U.S. PATENT DOCUMENTS

| | | | |
|---|---|---|---|
| 4,995,726 | 2/1991 | Fujita et al. | 356/349 |
| 5,061,071 | 10/1991 | Fujita et al. | |
| 5,493,395 | 2/1996 | Otsuka | 356/349 |
| 5,526,118 | 6/1996 | Miyagawa et al. | 356/349 |

FOREIGN PATENT DOCUMENTS

WO93/24805  12/1993  WIPO .

OTHER PUBLICATIONS

Dresel et al., "Three Dimensional Sensing of Rough Surfaces By Coherence Radar", App. Opt., vol. 3, No. 7, Mar. 1, 1992.

Primary Examiner—Robert H. Kim
Attorney, Agent, or Firm—Kenyon & Kenyon

[57] ABSTRACT

An interferometric instrument for scanning the surfaces of a test object by measuring the interference maximum contains a radiation generating unit that emits briefly coherent radiation. It is possible to perform precise measurements relatively easily even at difficult-to-access points on the test object by splitting the first beam into at least two additional beams using at least one additional beam splitter. One additional beam, referred to as a reference beam, is supplied to a reference mirror positioned at a specific distance from the additional beam splitter. Another additional beam, referred to as a measuring beam, is deflected to a specific measuring point on the test object. The interference maxima of the reference beam and the measuring beam can be detected separately by the photodetector arrangement and the control system.

10 Claims, 1 Drawing Sheet

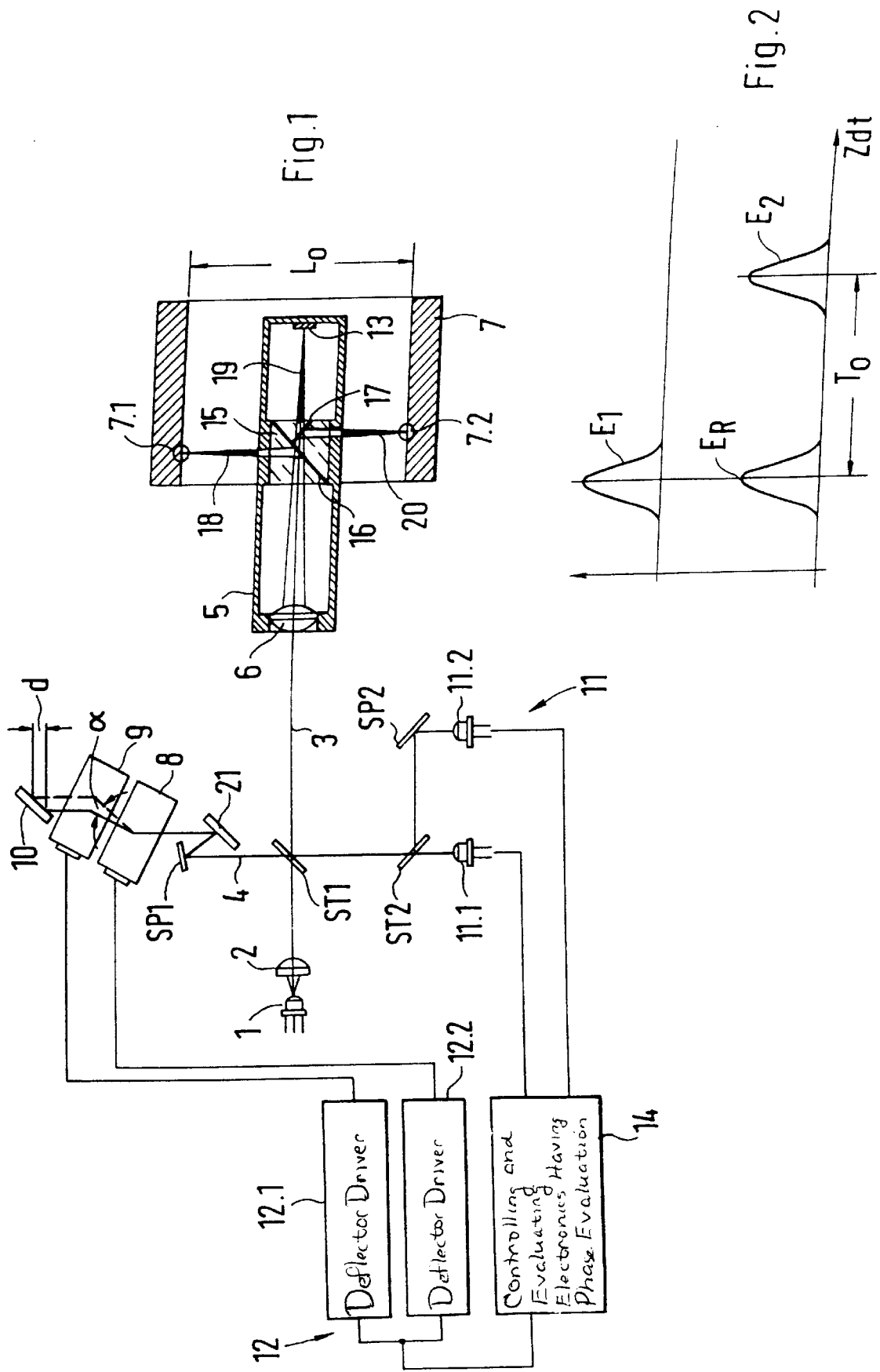

INTERFEROMETRIC INSTRUMENT

FIELD OF THE INVENTION

The present invention relates to an interferometric instrument for scanning the rough surfaces of a test object. The interferometric instrument of the present invention includes a radiation generating unit, which emits briefly coherent radiation, and an initial beam splitter for generating a first and second beam component. One beam component is aimed at the surface to be sensed and the other beam component is aimed at a device with a reflective element for periodically changing the light path. The interferometric instrument of the present invention also has an interference element, which causes the beam coming from the surface and the beam coming from the reflecting device to interfere with one another, and a photodetector arrangement, which absorbs the interfered radiation and supplies electrical signals to a control system for evaluation.

BACKGROUND INFORMATION

A known interferometric instrument is described in the publication by T. Dresel, G. Häusler, H. Vanzke entitled "Three-Dimensional Sensing of Rough Surfaces by Coherence Radar," App. Opt., Vol. 3, No. 7, dated Mar. 1, 1992. This publication proposes an interferometer with a briefly coherent light source and a piezoelectric mirror for scanning rough surfaces. In the measuring instrument, a first beam component in the form of a light wave radiated back from a test object has a second beam component in the form of a reference wave superimposed upon it. The two light waves have a very short coherence length (just a few μm) so that the interference contrast reaches its maximum when the optical path difference is zero. A reflecting element in the form of a piezoelectric mirror is provided for changing the light path of the reference wave. The distance to the test object can be determined by comparing the position of the piezoelectric mirror with the time at which the interference maximum occurs. However, this type of measuring instrument is frequently somewhat difficult to use in practical applications.

SUMMARY OF THE INVENTION

An object of the present invention is to provide an interferometric instrument that permits the precise and absolute sensing of, for example, a cavity in a test object.

The present invention therefore calls for the first beam component to be split into at least two additional beams by an additional beam splitter. One of the additional beams is supplied as a reference beam to a reference mirror positioned at a specific distance from the additional beam splitter, while the at least one additional beam is deflected as the measuring beam at a particular measuring point on the test object. The interference maxima of the reference beam and of the at least one measuring beam are detected separately by the photodetector arrangement and the control system. By splitting the first beam component into the reference beam and at least one measuring beam, and by measuring the respective reference maxima, an additional reference value is obtained which relatively easily permits an exact sensing of even difficult-to-access places in the test object.

According to an embodiment of the present invention, the interference maxima of the reference beam and the at least one measuring beam are separated on the basis of their time shift and/or different character of the radiation. These measures provide precise detection and evaluation capabilities by easily separating the interference maxima of the reference beam and the at least one measuring beam.

If one of the additional beam splitters is a polarization beam splitter, if the reference beam and the measuring beam split by the polarization beam splitter have different polarities, and if the reference beam and the measuring beam with the opposite polarity are supplied to different photodetectors in the photodetector arrangement, the reference beam and the at least one polarized measuring beam can be clearly separated and detected with simple means.

The fact that the at least one beam splitter and the reference mirror are located in the same sensor, with a focusing lens positioned in the combined light inlet and outlet side of this sensor, and are provided in the inlet and outlet window of the at least one measuring beam makes the arrangement easier to use. This setup eliminates the need for adjustments and simplifies the arrangement while maintaining a given design of the measuring head.

According to other measures for simplifying setup and evaluation, the device for changing the light path has an acousto-optical deflector arrangement with at least two acousto-optical deflectors, followed by the stationary reflecting element, positioned in the optical path of the second beam in order to change its light path. The deflectors are frequency-modulated and arranged in relation to the incoming second beam component and in relation to the reflecting element so that the second beam component supplied to the interference element has its light path changed by being deflected in the deflectors. The present invention advantageously calls for the first deflector to deflect the incoming beam around an angle that is variable over time as a function of the frequency and for the second deflector to reset the angular deflection so that the second beam component continues to move in the direction of incidence parallel to the first deflector. The present invention also calls for the reflecting element to be designed as a diffraction grating oriented at an angle to the beam leaving the second deflector so that the beam is radiated back in the direction of incidence.

The interference maximum can, for example, be precisely evaluated by providing, in the optical path of the first beam component and/or in the optical path of the second beam component, an arrangement which produces a frequency shift between the two interfering beam components. For simplification, the carrier frequencies of the two deflectors can be modulated by a common control unit.

The interference maximum can, however, be more easily and more precisely evaluated by designing the arrangement as an acousto-optical modulator which is driven by a modulator driver and is positioned between the first beam splitter and the test object in the optical path of the first beam component.

BRIEF DESCRIPTION OF THE DRAWINGS

FIG. 1 shows an interferometric instrument for measuring the interference maximum according to the present invention.

FIG. 2 shows signal curves obtained by the interferometric instrument shown in FIG. 1.

DETAILED DESCRIPTION

FIG. 1 shows an intereferometric instrument that includes a briefly coherent radiation generating unit in the form of a light source 1 such as, for example, an injection laser diode.

The beam produced by light source 1 is collimated by a collimator 2 and is split into first and second beam components 3 and 4 by an initial beam splitter ST1. First beam component 3 is supplied to a focusing lens 6. Two optical acousto-optical deflectors 8, 9 directs the second beam component 4 to a mirror SP1 and a compensation grating 21, which is used to compensate for an angular dispersion and a spatial incoherence. The acousto-optical deflectors 8, 9 are frequency-modulated by a common deflector driver 12.

The frequency modulation causes the deflection angle of second beam component 4 to vary by an angle α in first acousto-optical deflector 8. In second acousto-optical deflector 9, second beam component 4 is subsequently deflected again in a direction in which it strikes first acousto-optical deflector 8. This produces a parallel shift in second beam component 4 as it leaves second acousto-optical deflector 9, with this second beam component 4 illuminating a reflecting element in the form of a diffraction grating 10. Diffraction grating 10 is inclined at a specific angle and designed so that, regardless of the parallel shift in the interferometric arrangement, diffracted second beam component 4 is radiated back to initial beam splitter ST1 via compensation grating 21, which is positioned optically parallel to diffraction grating 10. Diffracted second beam component 4 is thus superimposed on and interferes with first beam component 3 as it returns. The interference contrast reaches its maximum when both beam components 3, 4 have covered the same optical distance.

Since both acousto-optical deflectors 8, 9 are arranged so that the angular deflection of first deflector 8 is reset in second deflector 9, and the second beam component 4 shifts only in parallel, thereby producing a path change d, the light path or optical path (run time) of second beam component 4 is modulated. When the optical path difference between both beam components 3, 4 is zero, a photodetector 11.1 or 11.2 of a photodetector arrangement 11 positioned in the optical path of the interfered radiation detects the interference maximum. The distance to a measuring point 7.1 or 7.2 on a test object 7 can be precisely determined by comparing the time at which the interference maximum or the signal maximum of photodetector 11.1 or 11.2 is reached with the instantaneous frequency of deflector driver 12 in a control system 14.

A heterodyne interferometric analysis is used to more precisely measure the interference maximum. For this purpose, the two acousto-optical deflectors 8, 9 are respectively driven by a first and a second driver stage 12.1, 12.2 of a deflector driver 12 with slightly different carrier frequencies, with the frequency difference amounting to 0.5 MHZ, for example, in the case of a carrier frequency of some tens of MHZ. As a result, second beam component 4 undergoes a frequency shift that is equal to twice the difference between the carrier frequencies. In the example discussed above, that frequency shift would be 1 MHZ. The carrier frequencies are modulated by control system 14, which is also used to evaluate the interference maximum. Driving the two deflectors 8, 9 with slightly different carrier frequencies modulates the light path (run time) of second beam component 4. The distance to measuring points 7.1, 7.2 can be determined by comparing the time at which the heterodyne interference signal maximum is reached, for example using the instantaneous frequency of control system 14.

In order to detect measuring points 7.1. 7.2, which lie within a cavity in test object 7, first beam component 3 is directed into tubular sensor 5 via focusing lens 6, and aimed at a double-beam splitter 15, which has a first and a second splitting planes 16, 17. On first splitting plane 16, first beam component 3 is split into two components, namely a first additional beam component 18 in the form of a measuring beam and a second additional beam component 19 in the form of a reference beam. First additional beam component 18 and second additional beam component 19 are polarized perpendicularly to one another by polarizing first splitting plane 16. On second splitting plane 17, the beam passing through initial splitting plane 16 and forming reference beam 19 is split into third additional beam 20, also in the form of a measuring beam. Reference beam 19, which has just passed through double-beam splitter 15, is focused on a reference mirror 13 and, just like first and third additional beams 18, 20, illuminates initial beam splitter ST1, which acts as an interference element. Reference beam 19 also interferes with second beam component 4 after being reflected back and passing through focusing lens 6.

Reference beam 19 passes from initial beam splitter ST1 to second photodetector 11.2 via an additional beam splitter ST2, which has a blocking effect on this polarization plane, and another mirror SP2. Third additional beam 20, i.e., the measuring beam that was scattered back from second measuring point 7.2, also illuminates second photodetector 11.2. The beam scattered back from first measuring point 7.1, after being reflected on first splitting plane 16, reaches first photodetector 11.1 via initial beam splitter ST1 and additional beam splitter ST2, which is transparent to this polarization plane. Since reference beam 19 as well as both measuring beams 18, 20 interfere with second beam component 4 as it returns, the photodetectors 11.1, 11.2 each supply electrical signals (echoes), whose alternating component reaches a maximum when the relevant maximum of the three maxima occurs. FIG. 2 shows the signals obtained in the form of echo $E_1$ from measuring point 7.1, the echo $E_R$ of reference beam 19, and the echo $E_2$ of second measuring point 7.2 over time and separately for the two photodetectors 11.1, 11.2.

The measuring instrument, in particular sensor 5 for test object 7, can be calibrated with a standard. For this purpose, sensor 5 is inserted into a standard with a known diameter $L_0$ and positioned so that the time difference between maximum echo $E_1$ of measuring point 7.1, and echo $E_R$ of reference mirror 13 is zero, as shown in FIG. 2. In this position, a time difference $T_0$ is measured between the maximum of echo $E_R$ of reference mirror 13 and the maximum of echo $E_2$ of measuring point 7.2 and converted to a reference path $L_1$ corresponding to this time difference $T_0$. The arrangement of sensor 5 is preferably designed so that reference path $L_1$ is never zero for all test objects 7. Diameter $L_0$ and reference path $L_1$ are the calibration parameters of the system, and an unknown diameter $L_2$ can be determined on the basis of the condition $$L_x = L_0 - L_1 + \Delta L_{M1} L_R + \Delta L_{M2} L_R$$

where $\Delta L_{M1} L_R$ is the measured path difference between first measuring point 7.2 of test object 7 and reference mirror 13, while $\Delta L_{M2} L_R$ is the measured path difference between second measuring point 7.2 of test object 7 and reference mirror 13.

Based on the unknown diameter for test object 7 to be sensed, it is possible to very precisely measure a shape variance (in the range of just a few nanometers) based on a time shift between echo $E_1$ of initial measuring point 7.1 and echo $E_R$ of reference mirror 13 on the one hand and a variance in the interval between echo $E_2$ of second measuring point 7.2 and echo $E_R$ of reference mirror 13.

What is claimed is:

1. An interferometric instrument for sensing a surface of a test object, comprising:

a radiation generating unit for emitting a briefly coherent radiation;

a reflecting element for periodically changing a light path of a received beam component;

an initial beam splitter for generating a first beam component and a second beam component in response to the briefly coherent radiation, the first beam component being aimed at the surface of the test object and the second beam component being aimed at the reflecting element;

an interference element for causing the first beam component reflected from the surface of the test object and the second beam component reflected from the reflecting element to interfere with one another in order to produce an interfered radiation;

a photodetector arrangement for absorbing the interfered radiation and for producing a plurality of electrical signals in response to the absorbed interfered radiation;

a control system for evaluating the plurality of electrical signals;

at least one additional beam splitter for splitting the first beam component into a plurality of additional beams, wherein one of the plurality of additional beams is a reference beam, and wherein at least another one of the plurality of additional beams is at least one measuring beam that is deflected by the at least one additional beam splitter to a corresponding measuring point on the test object; and a reference mirror positioned at a predetermined distance from the at least one additional beam splitter, wherein the at least one additional beam splitter supplies the reference beam to the reference mirror, and wherein interference maxima of the reference beam and the at least one measuring beam are detected separately by at least one of the photodetector arrangement and the control system.

2. The interferometric instrument according to claim 1, wherein the interference maxima of the reference beam and of the at least one measuring beam are separated on the basis of at least one of a time shift and a predetermined characteristic of the interfered radiation.

3. The interferometric instrument according to claim 1, wherein:

the at least one additional beam splitter is a polarization beam splitter, the reference beam has a polarity that is different than a polarity of the at least one measuring beam, the photodetector arrangement includes a plurality of photodetectors, the reference beam is supplied to one of the plurality of photodetectors, and the at least one measuring beam is supplied to at least another one of the plurality of photodetectors.

4. The interferometric instrument according to claim 1, further comprising a sensor in which the at least one additional beam splitter and the reference mirror are positioned, the sensor including a focusing lens located on a combined light inlet and light outlet side of the sensor, and the at least one additional beam splitter and the reference mirror being respectively provided in at least one of an inlet window and an outlet window of the at least one measuring beam.

5. The interferometric instrument according to claim 1, wherein the reflecting element is an acousto-optical deflector arrangement positioned in an optical path of the second beam component in order to change the optical path of the second beam component, the acousto-optical deflector arrangement including:

a first acousto-optical deflector, a second acousto-optical deflector, and a stationary reflecting element, wherein each one of the first acousto-optical deflector and the second acousto-optical deflector is frequency modulated and positioned in relation to the second beam component to determine a predetermined amount by which the second beam component supplied to the interference element is deflected in the first acousto-optical deflector and in the second acousto-optical deflector.

6. The interferometric instrument according to claim 5, wherein the first acousto-optical deflector deflects the second beam component around an angle by an angular deflection that is variable over time as a function of a predetermined frequency, wherein the second acousto-optical deflector resets the angular deflection so that the second beam component moves parallel to the first acousto-optical deflector in a direction of incidence, and wherein the reflecting element includes a diffraction grating which is oriented at an angle to the second beam component at which the second beam component is radiated back in the direction of incidence.

7. The interferometric instrument according to claim 1, further comprising a frequency shift arrangement for producing a frequency shift between the first beam component and the second beam component and being positioned in at least one of an optical path of the first beam component and an optical path of the second beam component.

8. The interferometric instrument according to claim 5, further comprising:

a first deflector driver for driving the first acousto-optical deflector and operating in accordance with a first carrier frequency; and a second deflector driver for driving the second acousto-optical deflector and operating in accordance with a second carrier frequency that is different than the first carrier frequency in order to produce a frequency shift in the second beam component.

9. The interferometric instrument according to claim 8, wherein the first carrier frequency and the second carrier frequency are modulated by the control system.

10. The interferometric instrument according to claim 4, wherein the sensor is an acousto-optical modulator, and wherein the reference mirror is a modulator driver for driving the acousto-optical modulator, the acousto-optical modulator being positioned between the initial beam splitter and the test object in an optical path of the first beam component.

* * * * *